United States Patent
Isomura

[19]
[11] Patent Number: 5,887,197
[45] Date of Patent: Mar. 23, 1999

[54] APPARATUS FOR IMAGE DATA TO BE DISPLAYED BY TRANSFERRING ONLY DATA WHICH IS DETERMINED TO BE VALID AFTER SHIFTING THE DATA OVER A RANGE OF GIVEN LENGTH

[75] Inventor: Hiroshi Isomura, Kawasaki, Japan

[73] Assignee: Fujitsu Limited, Kanagawa, Japan

[21] Appl. No.: 494,567

[22] Filed: Jun. 22, 1995

[30] Foreign Application Priority Data

Jul. 20, 1994 [JP] Japan .................................... 6-168157

[51] Int. Cl.$^6$ ....................................................... G06F 13/00
[52] U.S. Cl. ............... 395/875; 395/183.01; 395/185.01; 395/850; 395/853; 371/48; 371/67.1; 371/71; 345/121; 345/214; 345/522; 382/260; 382/295; 382/309
[58] Field of Search ............................ 345/121; 348/296, 348/390; 360/72.2; 365/189.02; 382/295; 395/250, 307, 495, 183.01, 185.01, 850, 853, 875; 371/48, 67.1, 71

[56] References Cited

U.S. PATENT DOCUMENTS

| | | | |
|---|---|---|---|
| 4,099,231 | 7/1978 | Kotok et al. ............................ | 395/495 |
| 4,225,941 | 9/1980 | Moran .................................... | 395/307 |
| 4,318,172 | 3/1982 | Yamada et al. ......................... | 395/250 |
| 4,737,778 | 4/1988 | Nishi et al. ............................. | 345/121 |
| 4,805,024 | 2/1989 | Suzuki et al. ........................... | 348/296 |
| 4,954,988 | 9/1990 | Robb ................................... | 365/189.02 |
| 5,084,837 | 1/1992 | Matsumoto et al. .................... | 395/250 |
| 5,148,271 | 9/1992 | Kato et al. .............................. | 348/390 |
| 5,241,625 | 8/1993 | Epard et al. ............................ | 395/502 |
| 5,384,673 | 1/1995 | Yoshioka et al. ...................... | 360/72.2 |
| 5,422,962 | 6/1995 | Yasukawa et al. ..................... | 382/295 |
| 5,491,780 | 2/1996 | Fyles et al. ............................. | 395/332 |

FOREIGN PATENT DOCUMENTS

60-172085  9/1985  Japan .
63-278181  11/1988  Japan .

*Primary Examiner*—Thomas C. Lee
*Assistant Examiner*—Anderson I. Chen
*Attorney, Agent, or Firm*—Staas & Halsey

[57] ABSTRACT

A data transfer system is provided for use in shifting and transferring image data and the like, wherein the amount of shift, the horizontal size and the like of data to be shifted are held in a dedicated circuit which is connected between a CPU and a memory. A judgment is made: by a valid/invalid indication unit, based on a valid/invalid parameter or the amount of deviation between the boundary unit and the transferred data after shifting, of the validity or invalidity of the head end or the trailing end of the data after shifting. A transfer suspension control unit eliminates the transfer of the data if the data is invalid after shifting, thereby enabling the increase of the speed of transfer of image data by avoiding the transfer of meaningless data.

13 Claims, 15 Drawing Sheets

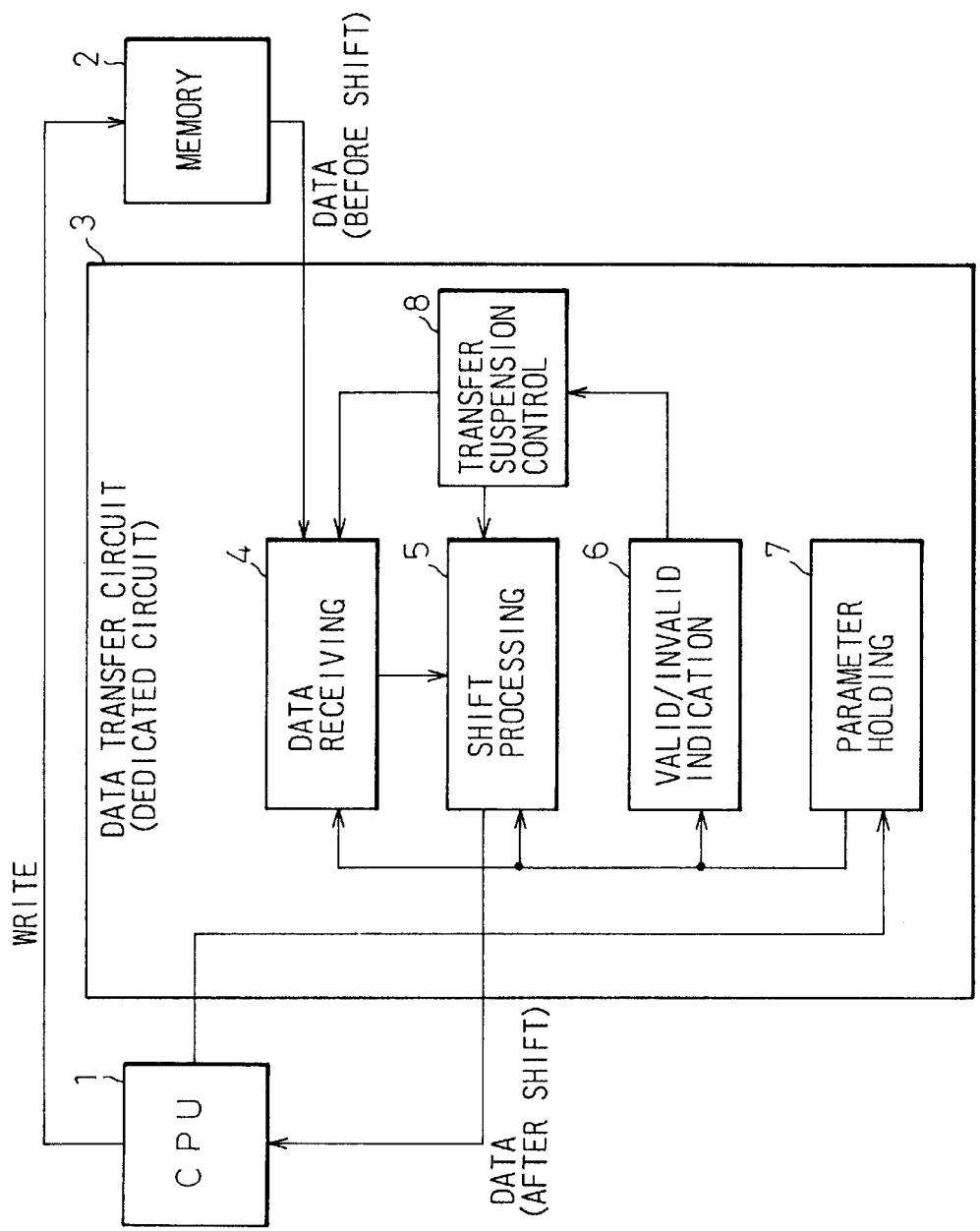

(BEFORE SHIFT)

(AFTER SHIFT)

(BEFORE SHIFT)

(AFTER SHIFT)

Fig.5A

CONTROL PROGRAM

| | | |
|---|---|---|
| S1 | MOV DX, 0F02H<br>MOV AX, 0003H<br>OUT DX, AX | ←ADDRESS OF *CS2<br>←NUMBER OF SHIFTS<br>←SETTING |
| S2 | MOV DX, 0F04H<br>MOV AX, 0005H<br>OUT DX, AX | ←ADDRESS OF *CS3<br>←NUMBER OF TRANSFER WORDS FOR EACH HORIZONTAL LINE<br>←SETTING |
| S3 | MOV DX, 0F06H<br>MOV AX, 0001H<br>OUT DX, AX | ←ADDRESS OF *CS4<br>←RIGHT END DATA AFTER SHIFT IS MADE VALID<br>←SETTING |
| S4 | MOV DX, 0F00H<br>MOV BX, 0000H | ←ADDRESS (ORIGINATION) OF *CS1<br>←INITIAL VALUE OF DESTINATION ADDRESS<br>←SETTING |
| S5 | IN AX, DX<br>MOV (BX), AX<br>ADD BX, 0002H | ←READ OF FIRST TIME<br>←WRITE OF FIRST TIME TO MEMORY (MEM)<br>←COUNT UP OF DESTINATION ADDRESS |
| S6 | IN AX, DX<br>MOV (BX), AX<br>ADD BX, 0002H | ←READ OF SECOND TIME<br>←WRITE OF SECOND TIME TO MEMORY (MEM)<br>←COUNT UP OF DESTINATION ADDRESS |

Fig.5B

| | | |
|---|---|---|
| S7 | IN AX, DX<br>MOV (BX), AX<br>ADD BX, 0002H | ← READ OF THIRD TIME<br>← WRITE OF THIRD TIME TO MEMORY (MEM)<br>← COUNT UP OF DESTINATION ADDRESS |
| S8 | IN AX, DX<br>MOV (BX), AX<br>ADD BX, 0002H | ← READ OF FOURTH TIME<br>← WRITE OF FOURTH TIME TO MEMORY (MEM)<br>← COUNT UP OF DESTINATION ADDRESS |
| S9 | IN AX, DX<br>MOV (BX), AX<br>ADD BX, 0002H | ← READ OF FIFTH TIME<br>← WRITE OF FIFTH TIME TO MEMORY (MEM)<br>← COUNT UP OF DESTINATION ADDRESS |
| S10 | IN AX, DX<br>MOV (BX), AX<br>ADD BX, 00F6H | ← READ OF SIXTH TIME<br>← WRITE OF SIXTH TIME TO MEMORY (MEM)<br>← CHANGE DESTINATION ADDRESS TO HEAD OF NEXT HORIZONTAL LINE |
| S11 | IN AX, DX<br>MOV (BX), AX<br>ADD BX, 0002H | ← READ OF FIRST TIME OF NEXT HORIZONTAL LINE<br>← WRITE OF FIRST TIME TO MEMORY (MEM) FOR NEXT HORIZONTAL LINE<br>← COUNT UP OF DESTINATION ADDRESS |
| ------ | ------ | ------ |

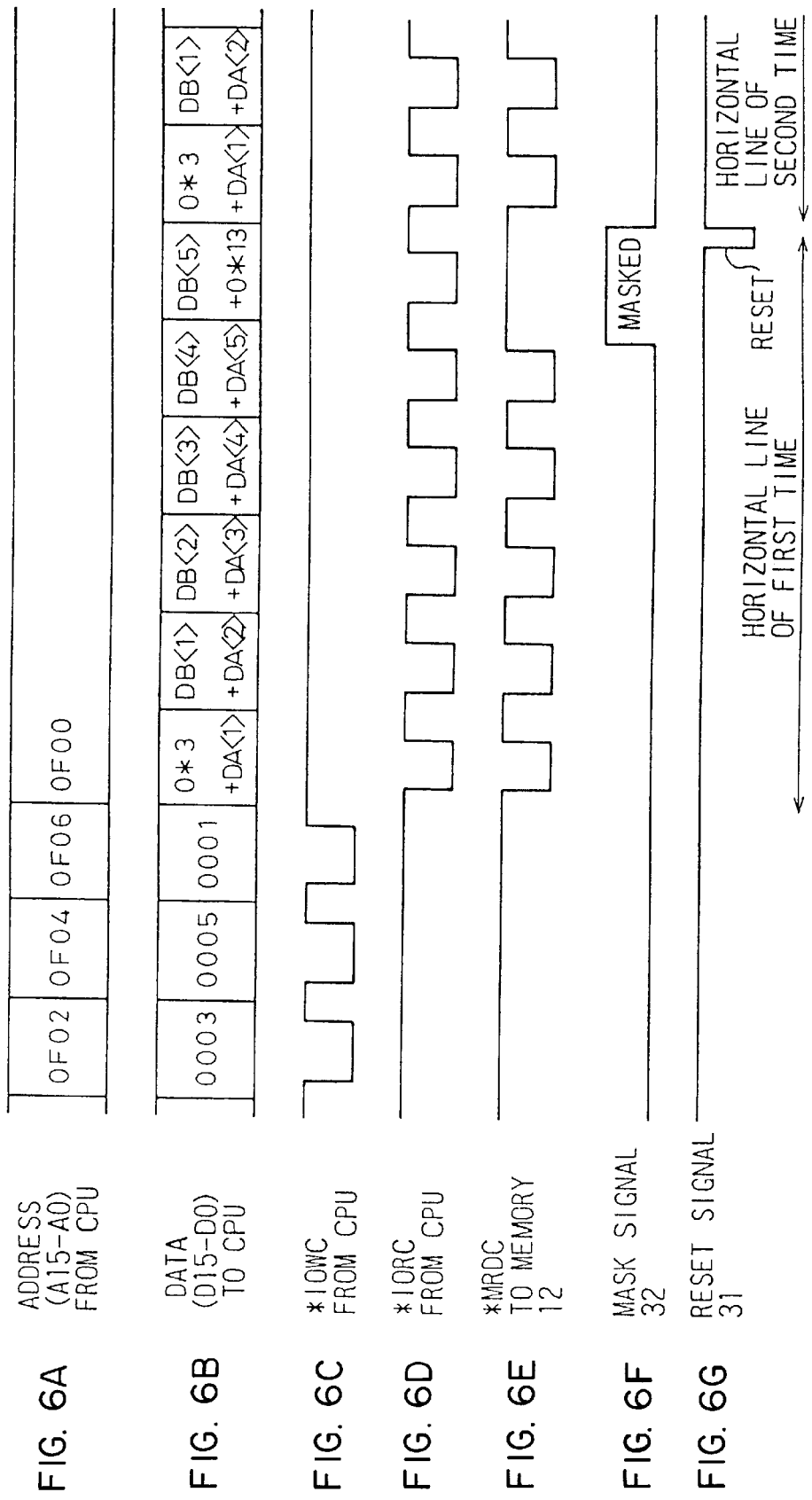

APPARATUS FOR IMAGE DATA TO BE DISPLAYED BY TRANSFERRING ONLY DATA WHICH IS DETERMINED TO BE VALID AFTER SHIFTING THE DATA OVER A RANGE OF GIVEN LENGTH

BACKGROUND OF THE INVENTION

1. Field of the Invention

The present invention relates to a data transfer control method and data transfer circuit capable of completing high-speed data transfer by eliminating unnecessary data when transferring image data, for a personal computer or word processor, while shifting it.

For example, when transferring image data which is generated from outline fonts to a video RAM, it is necessary to shift and transfer the data, and it is desirable to achieve high-speed processing of such transfer.

2. Description of the Related Art

In the past, when transferring image data while shifting the data, the size of the data in units of boundary was held as data, and if N data were received for each horizontal line of image data, N+1 writing operations were automatically performed, regardless of whether or not the image data was meaningful.

As a result, there arose a state in which part of the data transferred was unnecessary data.

The prior art includes an "apparatus for reading data from a bit-map display memory," as disclosed in the Unexamined Patent Application Publication (JP-A) Sho 63-278181. However, while this "apparatus for reading data from a bit-map display memory" was capable of continuously reducing the burden on the CPU by setting the amount of shift into a shifting means, there is no mention of useless data which is generated by the shifting of the data edges.

As will be explained, later and in detail, with reference to the accompanying drawings, when image data, starting from a boundary partition, which boundary is the unit of data writing, is shifted and transferred, the right end data of a horizontal line can contain a part that is meaningless as image data.

If the read range of image data that was input (read) at, for example, four times per horizontal line is shifted, after which it is output (written) at five times per horizontal line, the last write data becomes unnecessary. That is, the image data written at the fifth write operation is absolutely no data which is valid meaningful image data. This is because there is no determination made during the read operation as to how far the meaningful image data extends and the image data is defined in coarse boundary units.

After shifting, if the starting position of the image data does not coincide with a boundary partition, depending upon the size of the image data, and also on the relative positions between the boundary unit, which is the reading unit, and the image data, it is possible to write data which was read in with N read operations for each line by either N or N−1 write operations. However, in the prior art, because N+1 write operations were normally performed, either 1 or 2 write operations were unnecessary.

SUMMARY OF THE INVENTION

The present invention has an object the enabling the high-speed completion of image data transfer processing, by the elimination of the unnecessary transfer processing described above.

To achieve the above-noted object, the present invention stores into a dedicated circuit, which is connected between a central processing unit (CPU) and a memory, data relating to the amount of shift and the horizontal size of the image data to be shifted, a judgment being made as to the validity of front/rear end data after shifting by a validity/invalidity indication unit, based on a valid/invalid parameter or on the deviation between the boundary unit and the image data after shifting, and if the data after shifting is invalid, a transfer suspension control unit eliminating the data so that it is not transferred.

BRIEF DESCRIPTION OF THE DRAWINGS

The above-noted object and the features of the present invention will be more apparent from the following description of the preferred embodiments with reference to the accompanying drawings, wherein:

FIG. 1 is a block diagram which illustrates the principle of the present invention;

FIGS. 5A and 5B are drawings which show the flow of the control program in an embodiment of the present invention;

FIGS. 6A–6G are a timing diagram which shows the operation of the circuit shown in FIGS. 4A and 4B;

DESCRIPTION OF THE PREFERRED EMBODIMENT

Before describing the embodiments of the present invention, the related art and the disadvantages therein will be described with reference to the related accompanying drawings.

Figures 11A, 11B:
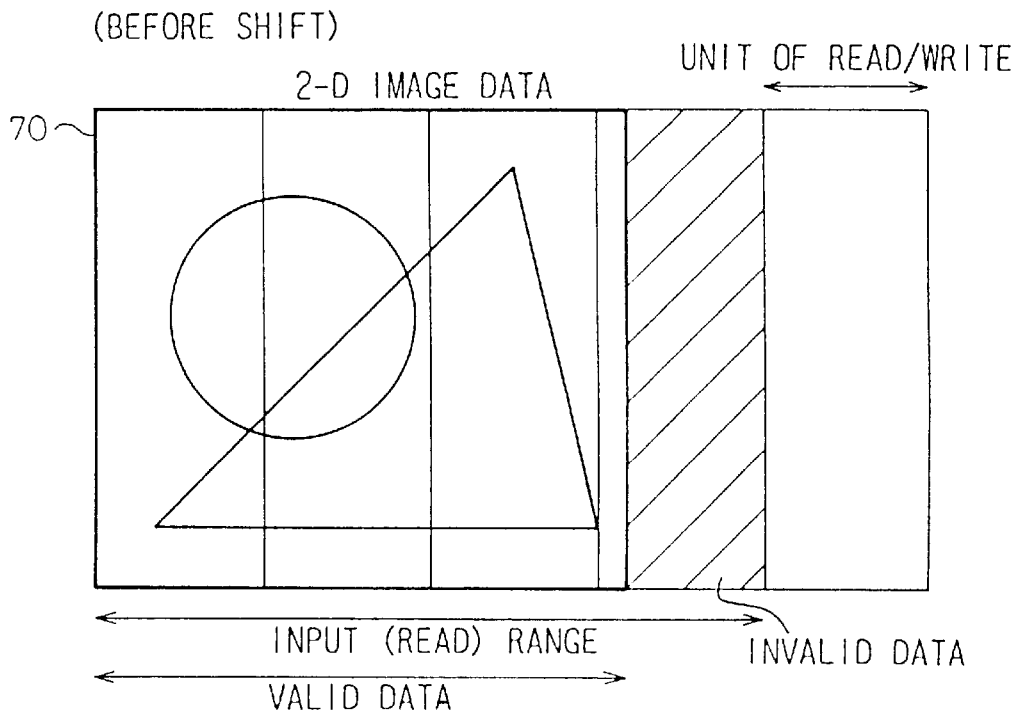
FIGS. 11A and 11B are drawings which show the conventional art.

FIGS. 11A and 11B show an example of the conventional art in the case in which there is a part of the data that is meaningless (unnecessary) as two-dimensional image data. FIG. 11A shows the two-dimensional image data before shifting, and FIG. 11B shows the two-dimensional data after shifting.

When shifting and then transferring image data starting from a boundary partition, which boundary is the unit of data writing, the right end data of a single horizontal line can contain a part that is meaningless as image data. The hatched portion of the two-dimensional image data 70 shown in FIGS. 11A and 11B is invalid data which has no meaning as image data.

As shown in FIG. 11A, if the read range of image data which is input (read) with four read operations per horizontal line is output after shifting as shown in FIG. 11B with five output (write) operations, because of the shifting, the data written by the fifth write operation contains absolutely no valid data that has meaning as image data. This is because there is no determination made during the read operation as to how far the meaningful image data extends and the image data is defined in coarse boundary units.

After shifting, if the starting position of the image data does not coincide with a boundary partition, depending upon the size between the image data, and also on the relative positions between the boundary unit, which is the reading unit, and the image data, it is possible to write data which was read in with N read operations for each line by either N or N−1 write operations. However, in the conventional art, because N+1 write operations were normally performed, in this case either 1 or 2 write operations were unnecessary.

The present invention enables high-speed completion of the image data transfer process by eliminating the type of unnecessary transfer processing described above.

To eliminate the type of unnecessary writing as shown in FIGS. 11A and 11B, whether or not the fifth write operation after shifting has any meaning is determined by calculations according to both the deviation between the boundary partition and the image data before shifting and the amount of shift and if the data does not have meaning (i.e., if it is invalid data), the writing can be stopped on the fourth write operation. That is, the fifth transfer can be suspended.

FIG. 1 is a conceptual block diagram of the present invention. In FIG. 1, the reference numeral 1 denotes a CPU, 2 is a memory for data that is to be read and written, 3 is a data transfer circuit used to shift and transfer data, 4 is a data receiving unit, 5 is a shift processing unit, 6 is a valid/invalid indication unit, 7 is a parameter holding unit, and 8 is a transfer suspension control unit.

The data receiving unit 4 receives image data read out from the memory 2 in a fixed sequence.

The shift processing unit 5 shifts the image data received by the data receiving unit 4 to the right or to the left, in accordance with an amount of shift which is set into the parameter holding unit 7.

The valid/invalid indication unit 6 judges, in accordance with parameters, either the validity of the forced out data which is generated by shifting, to the right or to the left, right end or left end data of the image data received by the data receiving unit 4 or the validity of the head data after the left end or right end of the image data received by the data receiving unit 4 is shifted to the right or left.

The parameter holding unit 7 holds data such as the amount of shift which is set from the CPU 1, the horizontal size of the image data to be shifted, the validity/invalidity of image data after shifting, and the relative positions between the image data partition and the boundary unit.

The transfer suspension control unit 8, in accordance with an indication from the valid/invalid indication unit 6, transfer image data to the CPU 1 if the data after shifting is valid, and suspends transfer of image data if the means 6 indicates invalid data.

To eliminate the unnecessary writing part after shifting, it is necessary to confirm whether the data has meaning as image data. To do this, based on data of the deviation between the boundary partition which is the write unit and the right and left ends of the image data, the valid/invalid indication unit 6 judges the meaningfulness of the data after shifting, and gives the results of that judgment to the transfer suspension control unit 8. Also, based on the data valid/invalid information of the data after shifting which is set into the parameter holding unit 7 by the CPU 1, the valid/invalid indication means 6 outputs a valid/invalid indication to the transfer suspension control unit 8.

The image data received by the data receiving unit 4 is shifted by the shift processing unit 5. While the shift processing unit 5 continues to output the resultant shifted data, the transfer suspension control unit 8 transfers, at the last output for each horizontal line, image data outside the CPU 1 or like only when the indication from the valid/invalid indicating unit 7 indicates that the image data is valid. If the indication is of invalid image data the first data of the next horizontal line is output. The setting of the amount of shift, the size of the image data and the validity/invalidity need only be achieved one time initially, and shifted data is output continuously.

In accordance with the present invention, it is possible to eliminate the needless transfer of unnecessary data. There are the following modes (1) to (8) in the elimination of unnecessary transfer.

(1) In the case in which image data is shifted to the right, whether or not the forced out data generated because of the shift of the right end data of the image data to the right is valid is set beforehand into the data transfer circuit, and if the forced out data after the shift is, according to this setting, valid data, the data is transferred, but if it is invalid data, transfer is suspended.

(2) Instead of having the judgment of validity/invalidity set directly by, for example, the CPU, in case of (1) above, the amount of deviation between the boundary partition and the right end data of the image data is set into the data transfer circuit, the image data validity/invalidity after shifting being judged based on that amount of deviation and the set amount of shift, and transfer being performed if the forced out data after shifting is valid, and being suspended if it is invalid.

(3) In the case in which image data is shifted to the right, the image data validity/invalidity after shifting the left end data to the right is set beforehand into the data transfer circuit, and if the left end data after the shift is, according to this setting, valid data, the data is transferred, but if it is invalid data, the transfer is suspended.

(4) Instead of having the judgment of validity/invalidity set directly by, for example, the CPU, in case of (3) above, the amount of deviation between the boundary partition and either the right end or left end data of the image data is set into the data transfer circuit, the head data validity/invalidity after shifting being judged based on that amount of deviation and the set amount of shift, transfer being performed if the head data after shifting is valid, and being suspended if it is invalid.

(5) In the case in which image data is shifted to the left, whether or not the forced out data generated because of the shift of the left end data of the image data to the left is valid is set beforehand into the data transfer circuit, and if the forced out data after the shift is, according to this setting, valid data, the data is transferred, but if it is invalid data, transfer is suspended.

(6) Instead of having the judgment of validity/invalidity set directly, for example, by the CPU, in case of (5) above, the amount of deviation between the boundary partition and the left end data of the image data is set into the data transfer circuit, the image data validity/invalidity after shifting being judged based on that amount of deviation and the set amount of shift, transfer being performed if the forced out data after shifting is valid, and being suspended if it is invalid.

(7) In the case in which image data is shifted to the left, whether or the right end data is valid after shifting to the left is set beforehand into the data transfer circuit, and if the right end data after the shift is, according to this setting, valid data, the data is transferred, but if it is invalid data, transfer is suspended.

(8) Instead of having the judgment of validity/invalidity set directly by, for example, the CPU, in case of (7) above, the amount of deviation between the boundary partition and either the left end data or right end data of the image data is set into the data transfer circuit, the head data validity/invalidity after shifting being judged based on that amount of deviation and the set amount of shift, transfer being performed if the head data after shifting is valid, and being suspended if it is invalid.

In the conceptual block diagram of FIG. 1, the output from the CPU 1 is shown as an instruction to the data transfer circuit 3 to perform a readout operation. By a pre-calculation by itself, or notification from the data transfer circuit 3, CPU 1 can know how many write operations are needed for one horizontal line after shifting, image data which is received from the data transfer circuit 3 being sequentially written at specified destination addresses in memory.

What follows is a specific description of the case in which input image data having a left end which coincides with a boundary partition is shifted to the right and transferred when displaying the image data from memory 2 in a two-dimensional bit map display region. Because the data transfer circuit 3 is a dedicated data transfer circuit in this embodiment of the present invention, this data transfer circuit will be referred to simply as the dedicated circuit in the description to follow.

Figure 2A:
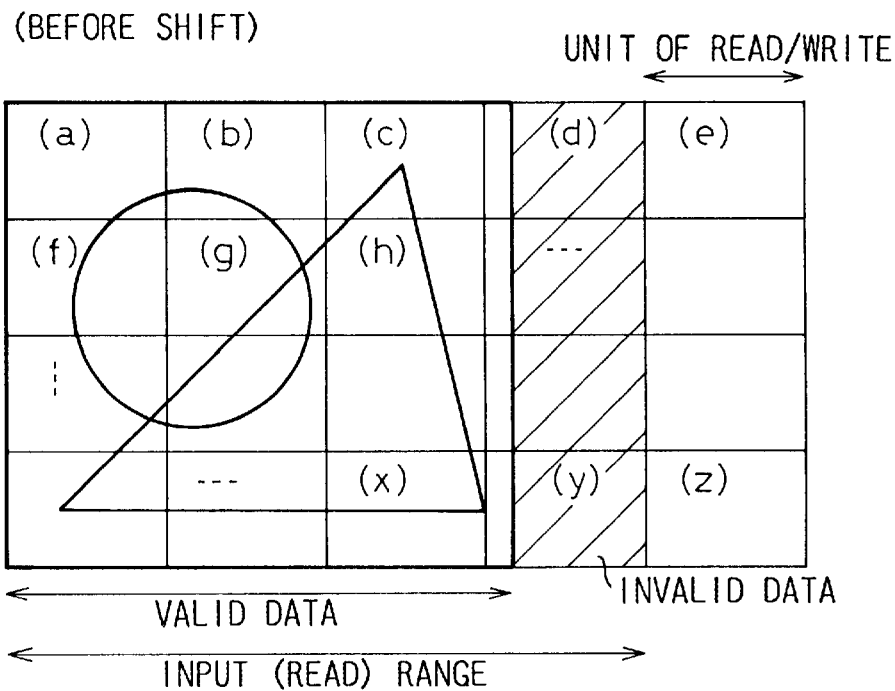
FIG. 2A and 2B are drawings which illustrate the processing operations in an embodiment of the present invention.
Figure 2B:
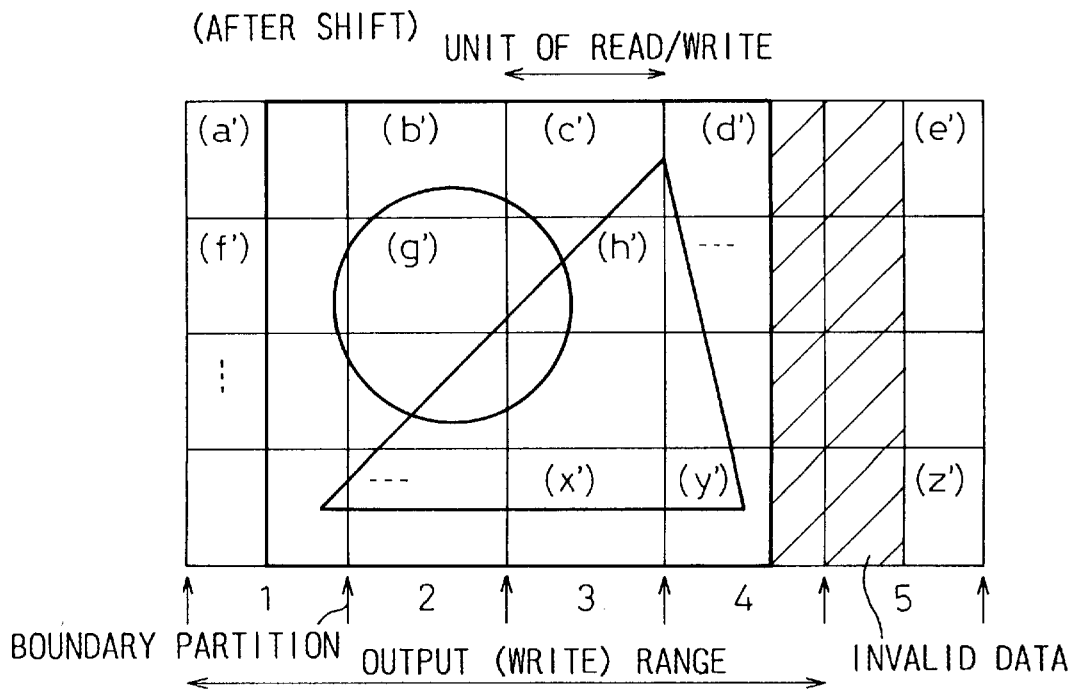

FIGS. 2A and 2B illustrate the processing operations in an embodiment of the present invention. FIG. 2A shows the image data before shifting, while FIG. 2B shows the image data after shifting, with (a), (b), (c), (d), . . . , (z) each being units that are read out at in one operation.

In the case of image data, the dedicated circuit 3 receives data such as shown in FIG. 2A before shifting, performs the required amount of shift of this data, and transfers (outputs) shifted data such as shown in FIG. 2B.

In doing this, focusing on the input data before shifting, the regions which are the four boundaries from the left are input in the sequence (a), (b), (c), (d), (f), (g), . . . , (x), (y), with (e) and (z) not being input. After shifting, the output sequence is (a'), (b'), (c'), (d'), (f'), (g'), . . . , (x'), (y').

The CPU 1 calculates beforehand from the invalid data bit unit width in the fourth boundary units such as (d) and (y) and from the amount of shift to the right that the rightmost fifth boundary regions such as (e') and (z') do not contain meaningful data, and accordingly sets the valid/invalid setting of the parameter to be set into the dedicated circuit 3 invalid. By this setting, the dedicated circuit 3 determines these regions (e') and (z') invalid and does not output the data from these regions.

Figure 3A:
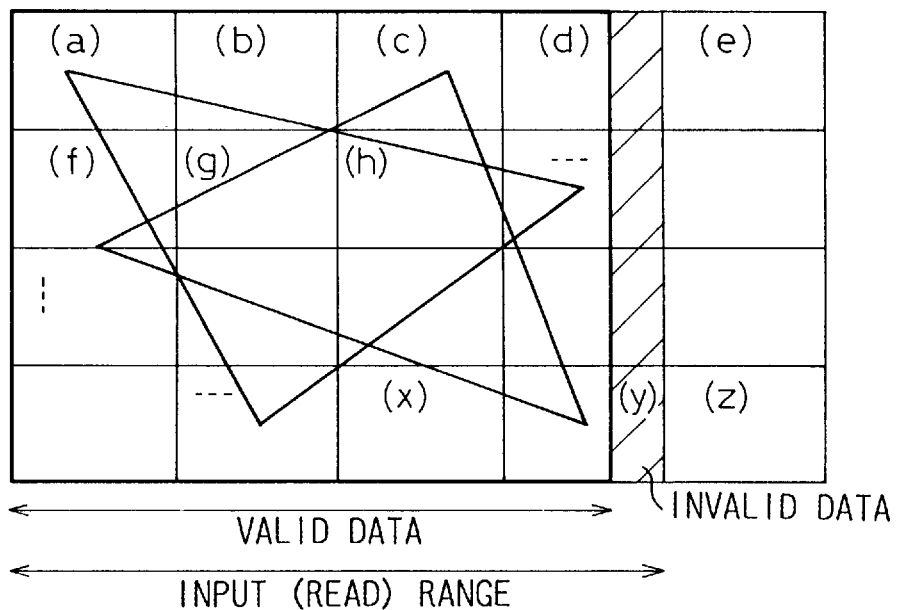
FIGS. 3A and 3B are drawings which illustrate the processing operations in an embodiment of the present invention.
Figure 3B:
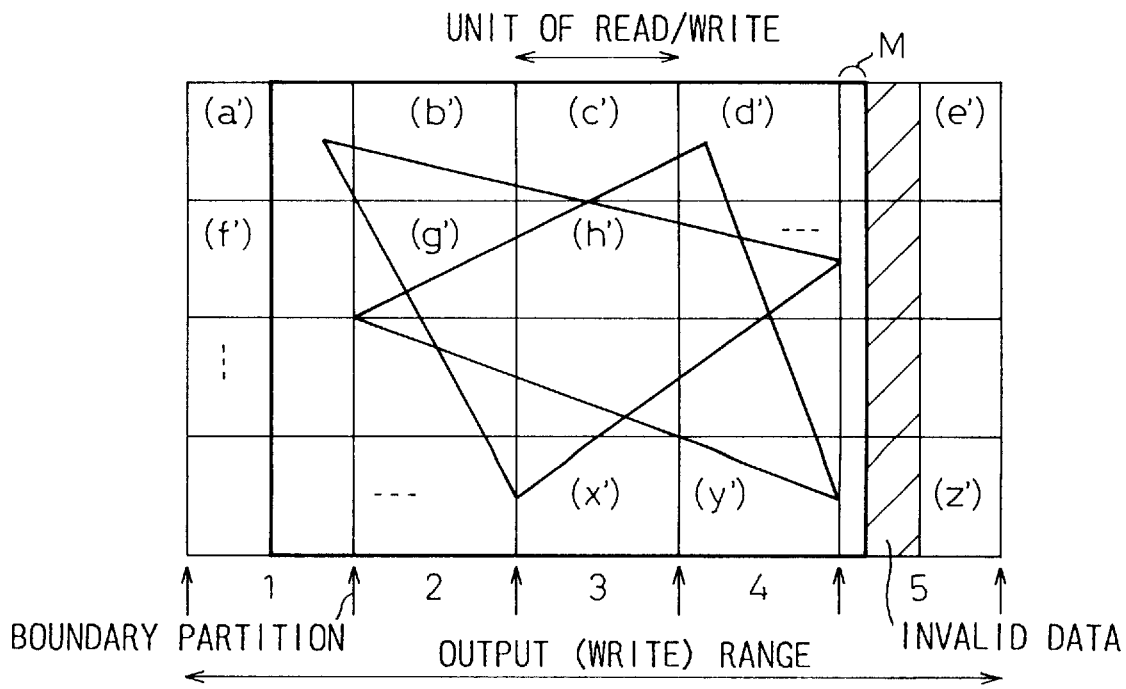

FIGS. 3A and 3B show the example of the case in which image data after shifting passes over a boundary partition and moves into the rightmost fifth boundary partition.

In this case, as shown in FIG. 3A, the input data before shifting, similar to the example shown in FIG. 2A, is input in the sequence (a), (b), (c), (d), (f), (g), . . . , (x), (y), with (e) and (z) not being input. After shifting, the output sequence is (a'), (b'), (c'), (d'), (f'), (g'), . . . , (x'), (y'). In contrast to the example shown in FIG. 2B, because of the fact that data in the rightmost boundary partition such as the (e') and (z') regions include meaningful data M will be determined by the judgment, the valid/invalid setting made into the dedicated circuit 3 will be set to valid. For this reason, the dedicated circuit 3 will output the data of the (e') and (z') regions as well.

The boundary unit spoken of herein is often an 8-bit byte, a 16-bit word, or a 32-bit double word, and the present invention can be applied in any of these cases.

Figure 4A:
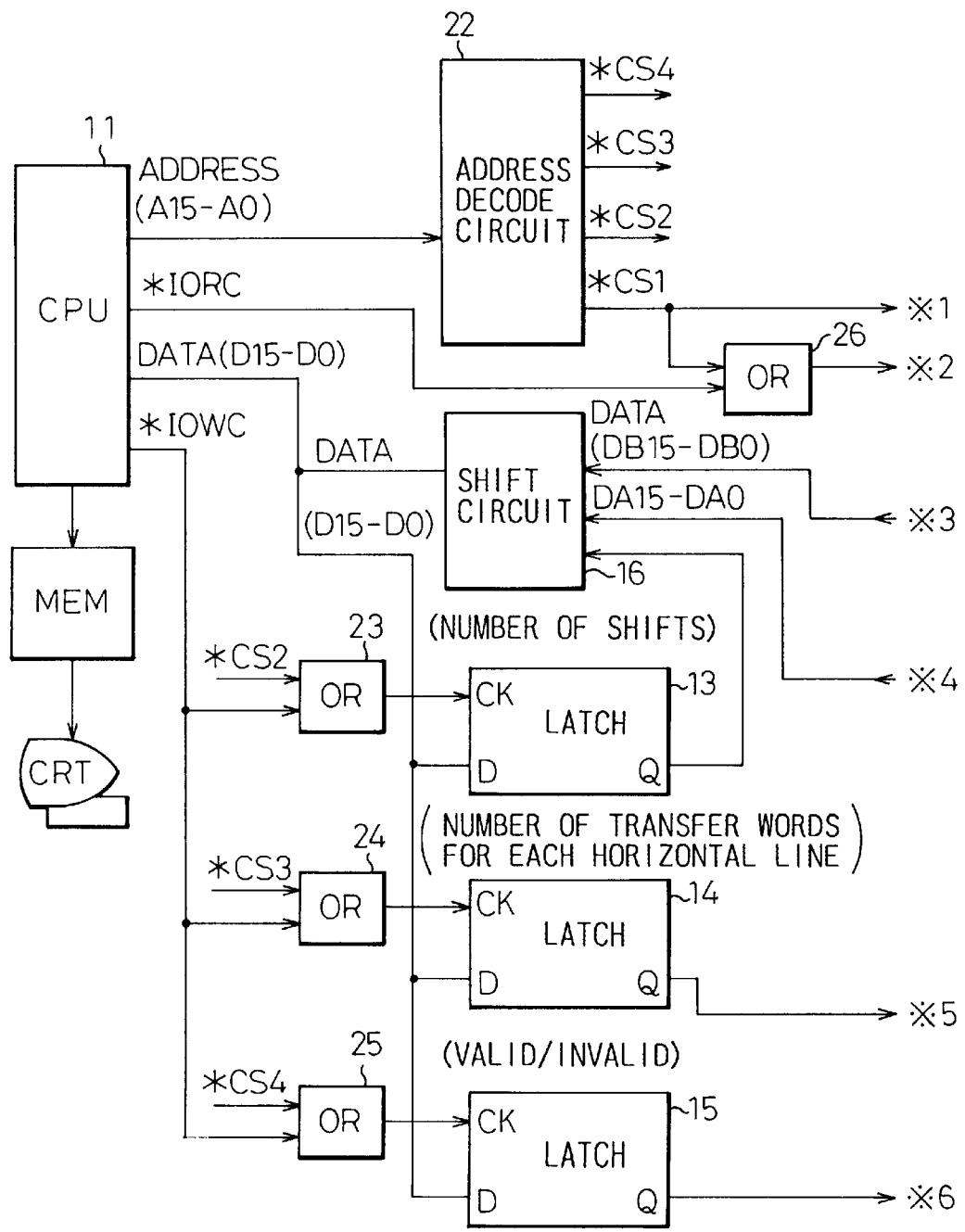
FIGS. 4A and 4B are drawings which illustrates the configurations of the dedicated circuit of an embodiment of the present invention.
Figure 4B:
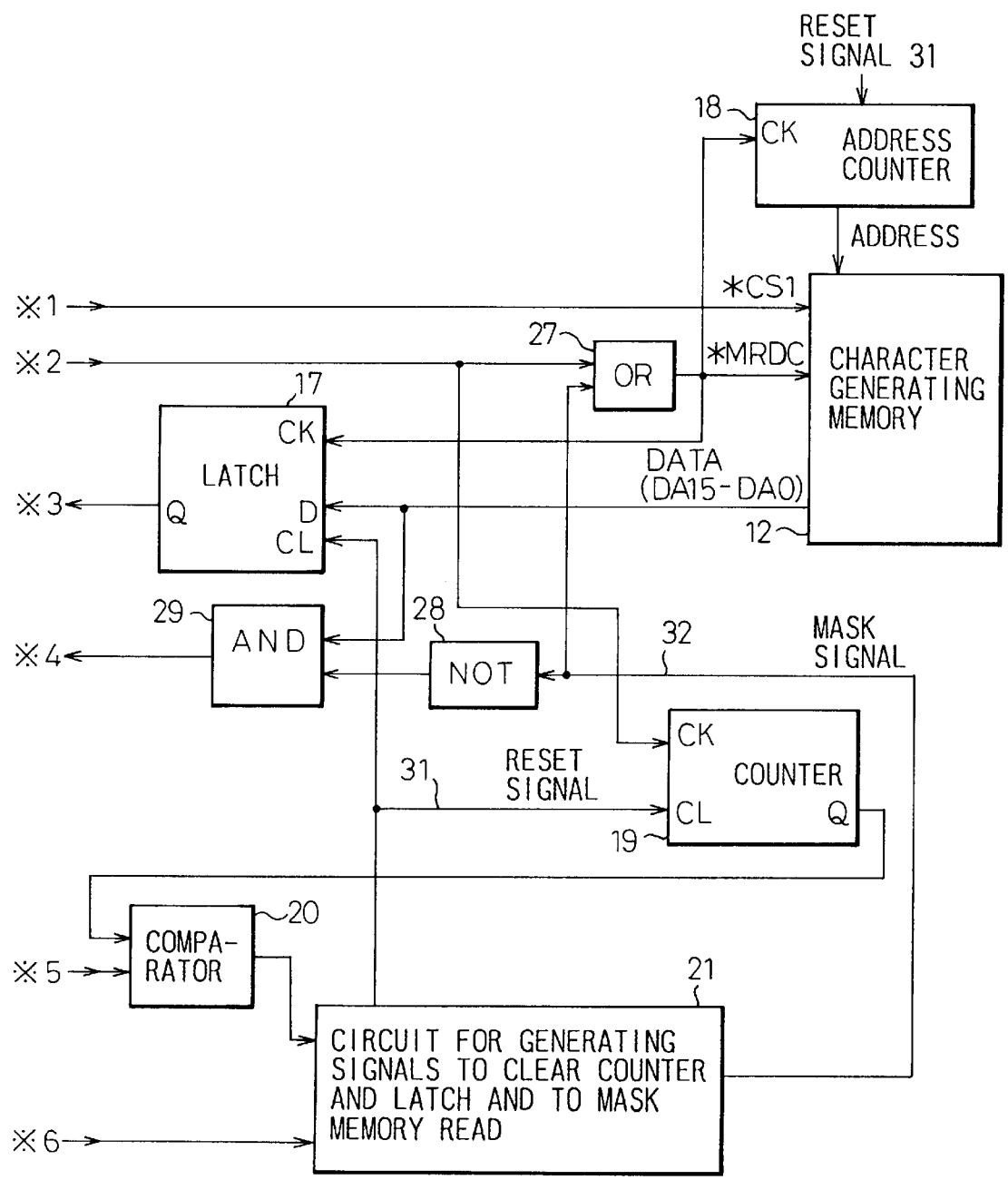

FIGS. 4A and 4B show examples of the dedicated circuit 3 of an embodiment of this present invention. This dedicated circuit 3 is connected between a character generating memory 12 which is the data source for image data transfer and a CPU 11. The character generating memory 12 can be, for example, a memory into which is stored image data of characters developed from outline fonts. The transfer destination of this image data is a bit-map display region, this being shown in FIG. 4A as a memory MEM.

In FIGS. 4A and 4B, CPU 11 corresponds to the CPU 1 shown in FIG. 1 and the character generating memory 12 corresponds to the memory 2 shown in FIG. 1. A latch 13, a latch 14, and a latch 15 correspond to the parameter holding unit 7 shown in FIG. 1. A shift circuit 16 corresponds to the shift processing control unit 5 shown in FIG. 1. A latch 17 and an address counter 18 correspond to the data receiving unit 4 shown in FIG. 1. A counter 19, a comparator 20, a circuit for generating signals to clear counter and latch and to mask memory read 21, an OR gate 27, and NOT circuit 28, and an AND gate 29 correspond to the valid/invalid indication unit 6 and transfer suspension control unit 8 shown in FIG. 1. An address decode circuit 22 decodes an address from the CPU 11, and outputs selection signals *CS1 through *CS4 which select the desired part. OR gates 23 through 25 are circuits which generate the setting signals to the latches 13 to 15, respectively, and OR gate 26 is a circuit which generates the read signals from the CPU 11 with respect to the character generating memory 12.

FIGS. 5A and 5B show an example of a control program for the purpose of transferring image data, this control program being executed by the CPU 11 shown in FIG. 4A, and FIG. 6 is a timing diagram which shows the operation of the dedicated circuit shown in FIGS. 4A and 4B. This operation will be described next, with reference to the above-noted drawings.

Before reading in the image data from the character generating memory 12, the CPU 11 sets the latches 13 through 15 to optimum values. As an example, the latch 13 into which is set the number of shifts is set to the value of 3, the latch 14 into which is set the number of words transferred per horizontal line is set to the value 5, and the latch 15 into which is set the valid/invalid condition of right end data after shifting is set to "valid."

The latch 15 being in the valid state unit that there were 5 originally transferred data words per line, this means that at least 1 bit of the 3 bits from the right of the fifth word at the rightmost position are significant data.

Next, CPU 11 performs an I/O read operation for the purpose of reading in the contents of the character generating memory 12.

During the first read in operation, the CPU 11 outputs the address which specifies *CS1, and outputs the I/O read command signal (*IORC). The address which is input to the character generating memory 12 is automatically generated by the address counter 18. The I/O read command signal (*IORC) passes through the OR gates 26 and 27, and is input to the character generating memory 12 as a memory read command signal (*MRDC), the data DATA (DA15 to DA0) being read out from the character generating memory 12. Since at this point the mask circuit 21 is not yet operating, the data is shifted 3 bits to the right by the shift circuit 16, DB2 to DB0 of the DATA (DB15 to DB0) from the latch 17 entering the 3 empty bits at the left end. That is, DB2 to DB0 and DA15 to DA3 are placed in the DATA (D15 to D0) to the CPU 11. At this point, since a reset signal 31 is applied beforehand to the latch 17, the signals DB2 to DB0 are zero.

When the first read-in operation is completed, DATA (DA15 to DA0) are read into the latch 17 at the rising edge of the *MRDC signal, and the values of DB15 to DB0 are changed. Also, address counter 18 counts up at the rising edge of the *MRDC signal, thereby incrementing the address of the character generating memory 12 in preparation for the next read-in operation. In addition, counter 19 counts up to keep a record of the word position of the read-in word in the current horizontal line. This completes the first read-in operation.

Thereafter, the CPU 11 writes the above-noted data into the memory MEM shown in FIG. 4A, which can be a video RAM or the like.

Next, the same type of operation is performed at the second read-in operation and the dedicated circuit 3, in response to the I/O read command signal (*IORC) from the CPU 11, places in DATA (D15 to D0), as output data of the shift circuit 16, the 3 bits DB2 to DB0 which are held in the latch 17 and which were not read out due to the shift of the data at the first read operation, and the data DA15 to DA3 of DA15 to DA0 which are newly read out from the character generating memory 12. By doing this, the CPU 11 reads in the DATA of the previous read operation (DB2 to DB0) and the currently read DATA (DA15 to DA3) as the DATA (D15 to D0). When viewed from the CPU 11, it is as if the character generating memory 12 has itself shifted the data to the right 3 bits and output the data.

The third through fifth read-in operations are performed in the same manner.

When the fifth read-in operation is completed, the output value of the counter 19 becomes the same as the output value of the latch 14, so that the output of the comparator 20 changes. That output is input to a circuit 21 for generating signals to clear the counter and the latch and to mask memory read (hereinafter referred to simply as circuit 21). Because the output of the latch 15 is in the valid state, the mask signal 32, which had been in the "0" state up until now, changes to the "1" state, thereby masking the *MRDC and DATA (DA15 to DA0). Because the data of the latch 15 is valid, a sixth read-in operation is performed for this horizontal line.

At the time of the sixth read-in operation, even if the CPU 11 outputs the *IORC signal, because this *IORC signal is masked by the OR gate 27, no *MRDC signal is input to the character generating memory 12. Therefore, the address counter 18 does not count, nor is DATA latched into the latch 17. The data that is placed in the shift circuit 16 is only the data DB15 to DB0 that was latched at the fifth read-in operation, and because DA15 to DA0 are masked at the AND gate 29 by the mask signal 32, they are all zero ("0"). Since this is shifted by 3 bits, the result is that the DATA (D15 to D0) received by the CPU 11 is (DB2 to DB0)+13 zeros ("0"). When the sixth read-in operation is completed, the reset signal 31 is output from the circuit 21, thereby resetting the counter 19 and the latch 17, in preparation for the next line.

In this manner, when viewed from the CPU 11, it is as if the character generating memory 12 is outputting 6 words of data for each horizontal line. Seen from the character generating memory 12, it is merely applying a read-out operation five times to one horizontal line.

Of the 5 words of data transferred for a single horizontal line, if all the 3 bits from the right of the rightmost fifth word are unnecessary data, latch 15 is set to "invalid" beforehand. In this case, the mask signal 32 is not output, so that if viewed from the CPU 11, five read-in operations for one horizontal line are carried out.

The valid/invalid setting of this latch 15 must be calculated and set by the CPU 11 program, this being made dependant on the size of the source data and the number of shifts.

FIGS. 5A and 5B show an example of a control program to be executed by the CPU 11 to perform the above-noted transfer.

At step S1 in FIG. 5A, the *CS2 address is specified, and the OUT instruction is issued for the purpose of setting the number of shifts in latch 13 to the value of 3. At step S2, the *CS3 address is specified, the OUT instruction is issued for the purpose of setting the number of words in latch 14 transferred per horizontal line to the value of 5. Then at step S3, the *CS4 address is specified and the OUT instruction is issued for the purpose of setting the latch 15 so as to make the right end data after shifting valid.

At step S4, the *CS1 address (the address of the character generating memory 12 which is the data source) is set into a register DX, and the initial value of the address of the memory MEM, which is the transfer destination is set into a register BX, these two registers being formed inside the CPU 11.

At step S5, an IN instruction performs the first read-in operation, the thus read-in data being written into the address of the transfer destination memory indicated by the register BX, and the transfer destination address in register BX being incremented.

At step S6, an IN instruction performs the second read-in operation, the thus read-in data being written into the address of the transfer destination memory indicated by the register BX, and the transfer destination address in register BX being incremented.

Thereafter, in the same manner, at step S7 the third read-in operation, the third write into the memory MEM, and incrementing of the transfer destination address are performed. At step S8, the fourth read-in operation, the fourth write into the memory MEM, and incrementing of the transfer destination address are performed, and at S9 the fifth read-in operation, the fifth write into the memory MEM, and incrementing of the transfer destination address are performed.

At step S10, the sixth read-in operation, and the sixth write into memory MEM are performed, the transfer destination address being changed this time, however, to the head of the next line (next horizontal line).

Then, at step S11, an IN instruction performs the first read-in operation on the next line, the first write into the memory MEM, and the incrementing of the transfer destination address. Thereafter, these operations are repeated in the same manner for the second and subsequent times for this next line, the processing ending when all the image data to be transferred is transferred.

FIGS. 6A–6G show the operational signals in the circuits shown in FIGS. 4A and 4B when the control program shown in FIGS. 5A and 5B is executed. In FIGS. 6A–6E, the **0\*3 and 0\*13 for the CPU DATA (D15–D0) indicates 3 zero ("0") bits and 13 zero bits, respectively. DA<1> represents the DA15 to DA3 part of the data read out from the character generating memory 12 at the first read-in operation. DA<2> represents the DA15 to DA3 part of the data read out from the character generating memory 12 at the second read-in operation. DA<3> and so on are the same for the subsequent read-in operations. DB<1> represents the DB2 to DB0 part of the output data from the latch 17, which holds the data read out from the character generating memory 12 on the first read operation. DB<2> represents the DB2 to DB0 part of the output data from the latch 17, which holds the data read out from the character generating memory 12** on the second read operation. The same is true for DB<3> and so on, with respect to subsequent read operations.

The CPU 11, based on a calculation made by the CPU 11 program, from the source data size and the number of shifts, sets into the latch 15 shown in FIG. 4A the valid/invalid condition of the right end data after shifting. However, rather than having the CPU 11 directly set this valid/invalid condition, it is possible to set into latches in the dedicated circuit 3 the deviation between the boundary partition of the source data and the right/left end image data, and to have the dedicated circuit 3 perform a judgment, based on this parameter and the amount of shift, of whether the right end data after shifting contains valid data. An embodiment of the present invention corresponding to this method will be described later, making reference to FIGS. 7A and 7B.

Although, in the above-noted embodiment of the present invention, the description was presented for the example in which the image data is shifted by the prescribed amount to the right, it is also possible to practice the present invention in the same manner for the case shifting to the left. For example, the up-counter which serves as the address counter (18 in FIG. 4A), can be replaced by a down-counter.

In addition, whereas in the above-noted embodiment of the present invention a valid/invalid judgment is made with respect to the right end data transferred for one horizontal line, data transfer being eliminated midway if the result of the judgment is that the data was invalid, in addition to this method, in a case in which the starting position of the original data does not correspond to a boundary partition, so that the first data after shifting is invalid data only, it is easy to see from the configurations shown in FIGS. 4A and 4B, that a circuit could be devised to make it possible in the same manner to set into the dedicated circuit 3 the valid/invalid information for the starting data beforehand, and in the case in which the starting data is valid data, to output this data, but if the data is invalid data, to not transfer data.

Figure 7A:
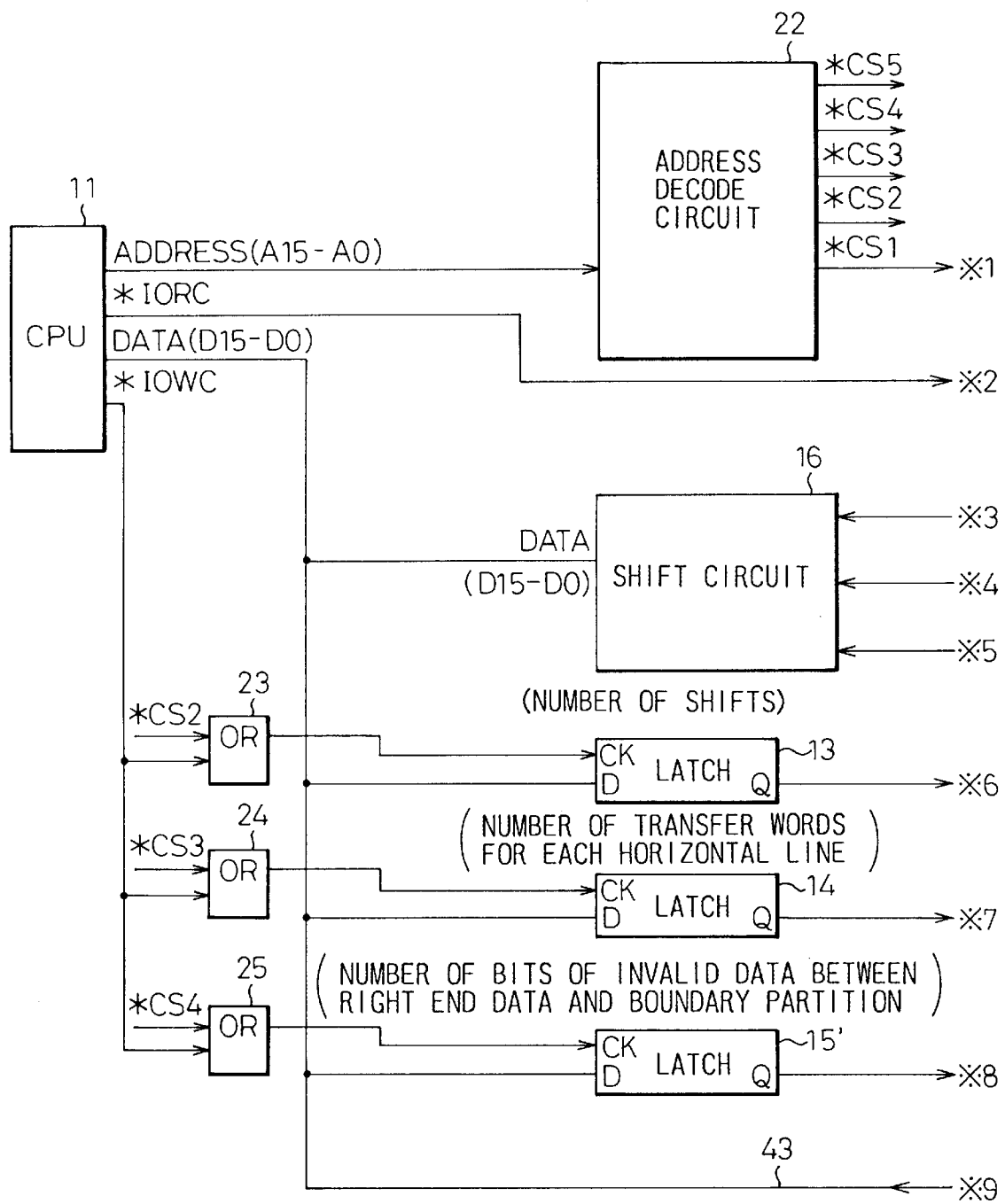
FIGS. 7A and 7B are drawings which illustrate an embodiment of the present invention in which, instead of the CPU directly setting the validity/invalidity of right end data, this setting is performed by the dedicated circuit.
Figure 7B:
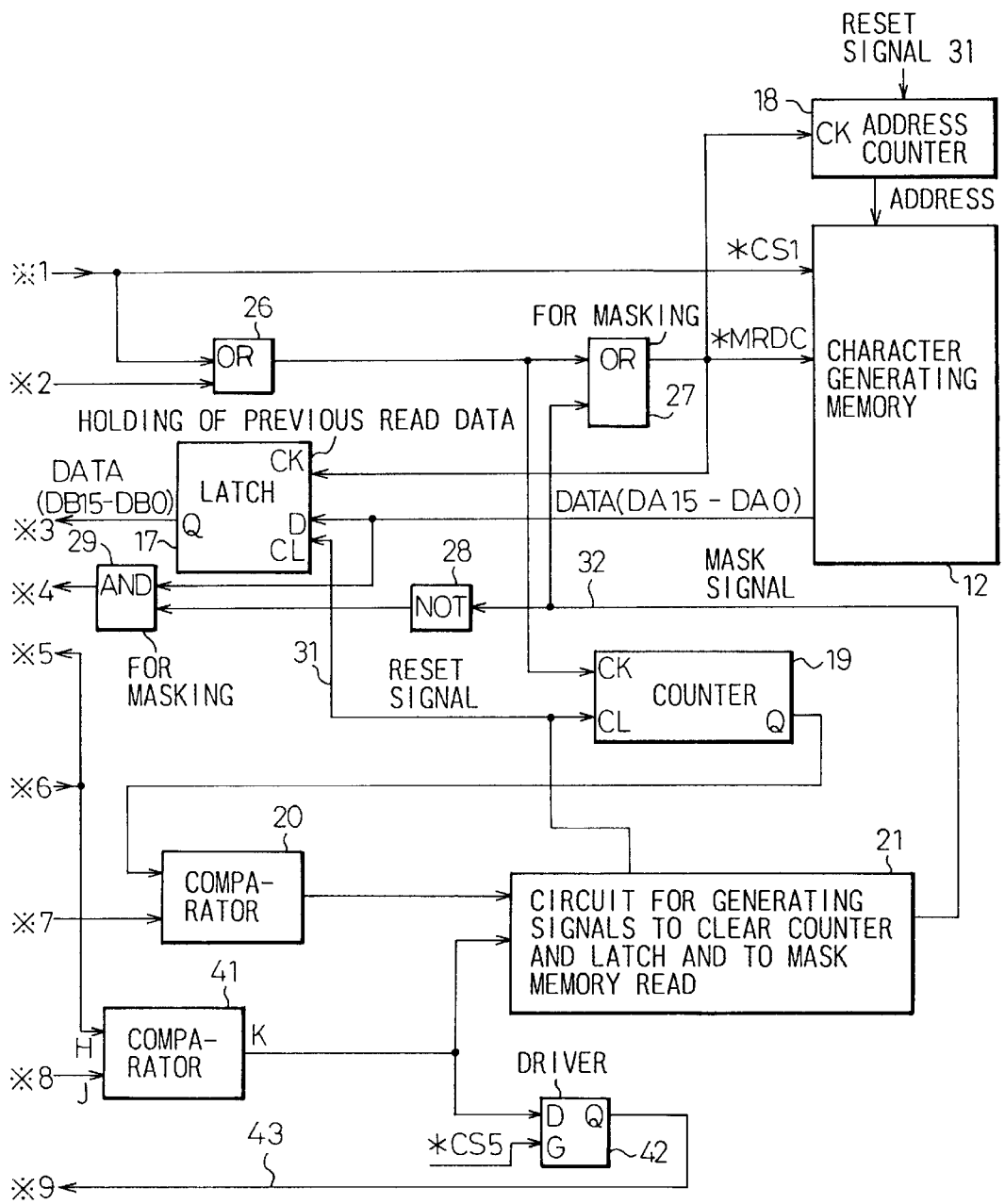

FIGS. 7A and 7B show an embodiment of the present invention in which, rather than having the CPU directly set the valid/invalid condition of the right end data, this setting is made by the dedicated circuit 3. In these drawings, constituent elements that are the same as shown in FIGS. 4A and 4B are assigned the same reference numerals or symbols. The constituent elements which appear as new elements in these drawings are assigned reference numerals 41 through 43.

In these drawings, the reference numeral 41 denotes a comparator, 42 is a driver, and 43 is a data transfer line.

The CPU 11 first outputs as DATA (D15 to D0) the number of shifts, the number of words transferred per horizontal line, and the deviation between the right end data and the boundary partition. These data are held by latch 13, 14, and 15', respectively.

Next, the comparator 41 compares the data that is held in latch 13 with the data that is held in latch 15'. Only in the case in which the data held in latch 13 is a larger value than the data which is held in latch 15' will the output of the comparator 41 be set to the value "1".

The operation described in more detail as follows. When the two inputs H and J of the comparator 41 are such that the condition H>J is satisfied, K="1". This indicates the condition in which the right end data is valid. On the other hand, if these inputs are such that the condition H≦J is satisfied, K="0", which indicates the right end data is invalid.

The CPU 11 outputs an address signal which specifies the selection signal *CS5, and an I/O read command is executed. When this is done, because the driver 42 is driven, the CPU 11 is notified, via the data transfer line 43, of the output results from the comparator 41.

In the above-noted embodiment, the description chiefly regards the case in which the valid/invalid judgment is made for the right end data. However, there is also the case in which this valid/invalid judgment is made with respect to the left end data.

Figure 8A:
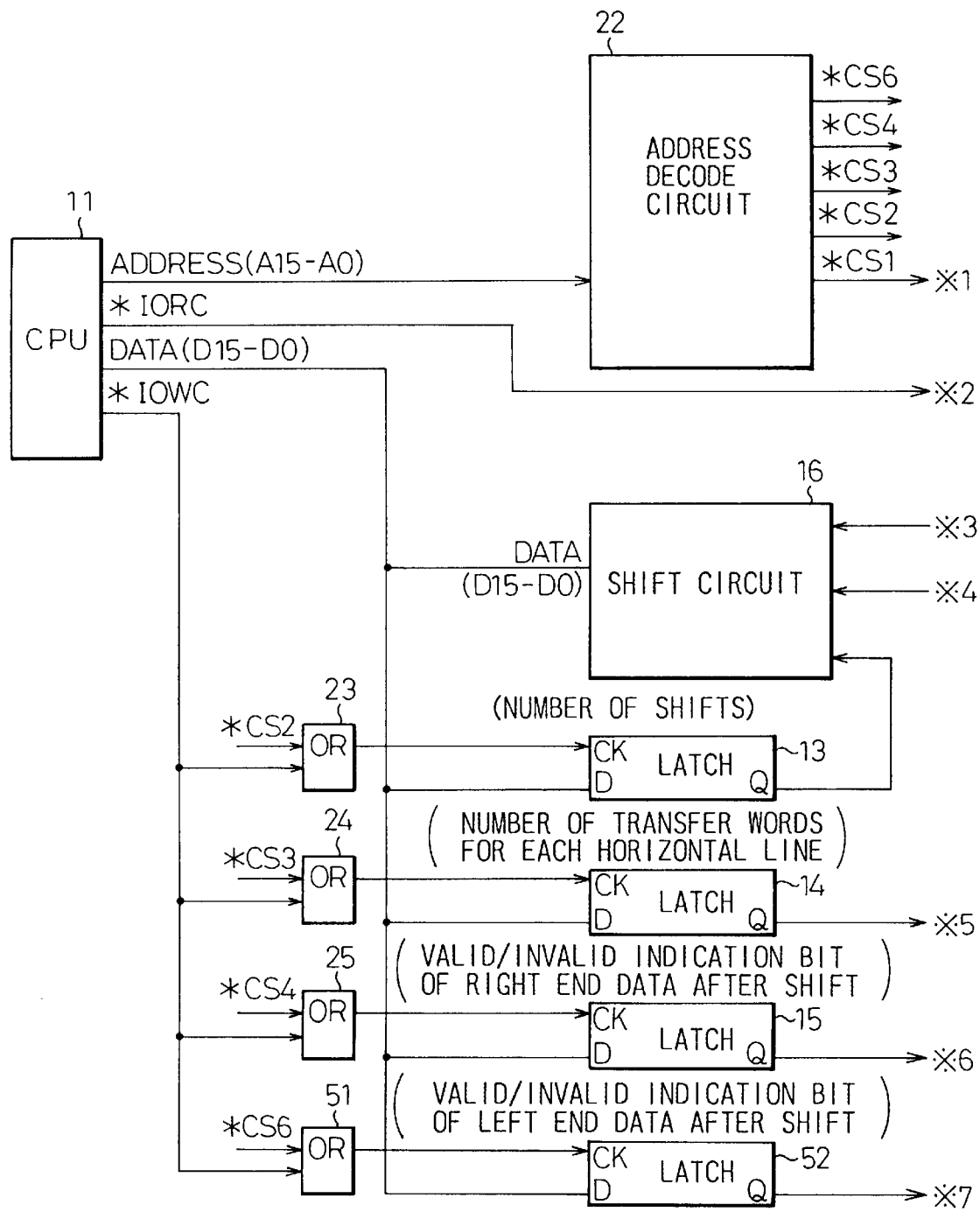
FIGS. 8A and 8B are drawings which show an embodiment of the present invention which makes a judgment as to the validity/invalidity of not only right end data, but of left end data as well.
Figure 8B:
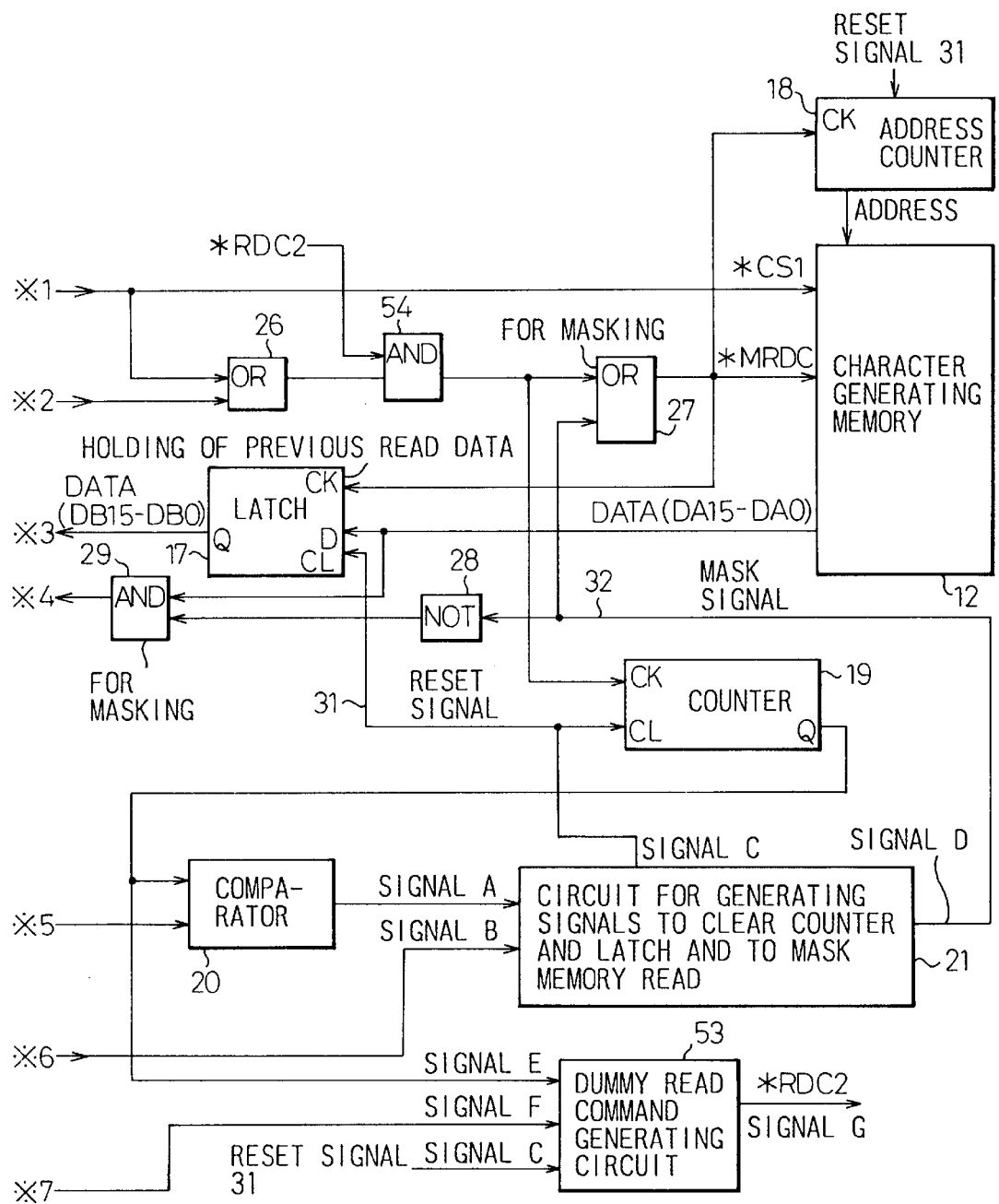

FIGS. 8A and 8B show an embodiment of the present invention in which the valid/invalid judgment is made with respect to not only the right end data, but also the left end data. In this drawing, constituent elements that are the same as shown in FIGS. 4A and 4B are assigned the same reference numerals or symbols. The constituent elements which appear as new elements in these drawings are assigned reference numerals 51 through 54. In these drawings, the reference numeral 51 denotes an OR gate, 52 is a latch, and 53 is a dummy read command generating circuit. The comparator 20 outputs the signal A (with a value of "1") when the values of its two inputs are equal.

The CPU 11 outputs an address which specifies the selection signal *CS6, the signal passing, via the OR gate 51, causing output of a bit which indicates the valid/invalid condition of the left end data after shifting. The Q output of the latch 52 is "0" for invalid and "1" for valid.

The dummy read command generating circuit 53 accepts the signal E, the signal F, and the signal C (the reset signal 31), and outputs the signal G (the read command *RDC2).

When the AND gate 54 receives the *RDC2 command signal, this gate opens, so that it passes the output of the OR gate 26.

Figure 9:
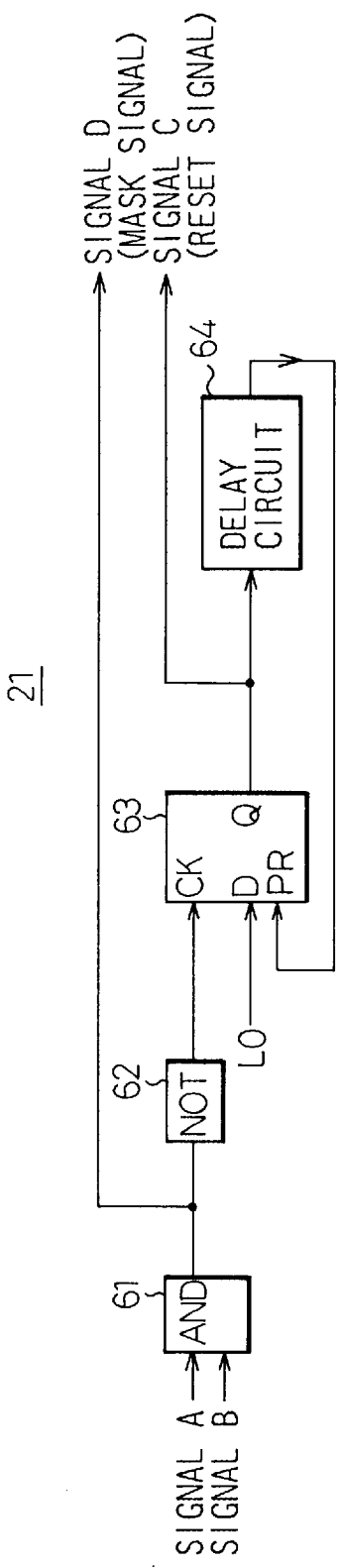
FIG. 9 is a drawing which illustrates a specific example of the block 21 which is shown in FIGS. 4B, 7B, and 8B.

FIG. 9 shows a specific example of the block 21 which is shown in FIG. 8B (and also in FIG. 4B and FIG. 7B). Specifically, the circuit 21 for generating signals to clear the counter and latch and to mask the memory read, is indicated in detail in this drawing. In FIG. 9, the circuit 21 is formed by an AND gate 61, a NOT circuit 62, a flip-flop 63, and a delay circuit 64.

The AND gate 61 receives as inputs the signals A and B. The D input of the flip-flop 63 is held at the low level by the signal LO, meaning that it is always at a value of "0". When the preset input PR of the flip-flop 63 has "0" applied to it, the Q output of the flip-flop 63 becomes "1".

The overall operation of circuit 21 shown in FIG. 9 is as follows.

When both signal A and signal B are "1", the mask signal D becomes "1" (the masked state). When CPU 11 executes the memory read command, the counter 19 operates, and as a result the signal A becomes "0", at the occurrence of the clock CK of the above-noted flip-flop 63, the change of signal from "0" to "1" is input. When the associated Q output changes to "0", the reset signal C is output. The reset signal, which is delayed by a delay circuit 64, is again input to the flip-flop 63, making the Q output "1", and the reset signal ends.

In the case in which a valid/invalid judgment is made not only for right end data but for left end data as well, even when a notification of the valid/invalid condition of the right end data after shifting, which is made by the transfer circuit 3, is received by the CPU 11, this circuit is shared.

Figure 10:
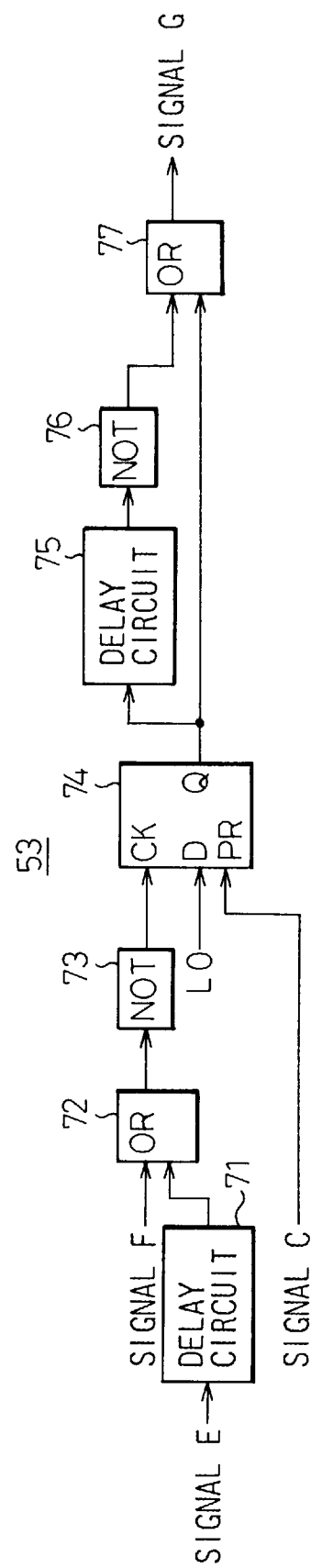
FIG. 10 is a drawing which illustrates a specific example of the block 53 which is shown in FIG. 8B.

FIG. 10 shows a specific example of block 53 which is shown in FIG. 8B. Specifically, this shows a specific example of the dummy read command generating circuit 53. In FIG. 10, the reference numeral 71 denotes a delay circuit, 72 is an OR gate, 73 is a NOT circuit, 74 is a flip-flop, 75 is a delay circuit, 76 is a NOT circuit, and 77 is an OR gate. The D input of the flip-flop 74 is held at the low level (LO). When "0" is applied to the PR input of the flip-flop 74, the Q output of the flip-flop 74 becomes "1". The reason that the delay circuit 75 is provided is to determine the width of the low-level ("L") signal G pulse by means of the delay of this circuit.

The overall operation of the circuit 53 which is shown FIG. 10 is as follows.

The signal E is input to the delay circuit 71 so that when the reset signal 31 is generated, an all "0" signal output from the counter 19 is not received during the time period in which the reset signal (signal C) is being input to the flip-flop 74 of the circuit 53.

When the signal E is all "0" and also the signal F is "0", the CK input of the flip-flop 74 changes from "0" to "1", so that the Q output of the flip-flop 74 becomes "0".

The signal G (low-level *RDC pulse signal) causes incrementing of the address counter 18 and the counter 19, and serves, among other things, to cause the latch 17 to hold the left end data before shifting of the character generating memory 12.

The present invention of course is not limited in application to transfer of image data from a character generating memory 12 to a video RAM (memory MEM), but can be applied as well in the same manner to general image data transfer in which the data must be shifted and transferred.

In the method of transferring image data in the conventional art, time was wasted in transferring meaningless image data.

With the present invention, however, by providing, among other things, a judgment of the valid/invalid condition of image data after shifting it, it is possible to complete the transfer of the image data at a high speed.

I claim:

1. A data transfer control method for shifting and transferring data of a given length by a prescribed amount using a data transfer circuit for transferring data from a data source device to a data destination device, wherein a data train to be transferred is shifted over a range which is partitioned by units of said given length, a valid/invalid condition of data which, by said shifting, exceeds said range is determined by at least one of an external determination unit and the data transfer circuit in accordance with the amount of shift and set into said data transfer circuit, and wherein said data transfer circuit outputs data which exceeds said range only when said data is valid.

2. A data transfer control method according to claim 1, wherein said range of data to be shifted is left end data of the train of said data, and wherein the valid/invalid condition of said left end data which, by shifting said data to the left, exceeds said range is set beforehand into said data transfer circuit, and further wherein said data transfer circuit outputs data which exceeds said range, according to said setting, only when said data is valid.

3. A data transfer control method according to claim 1, wherein said range of data to be shifted is right end data of the train of said data, and wherein the valid/invalid condition of said right end data which, by shifting said data to the right, exceeds said range is set beforehand into said data transfer circuit, and further wherein said data transfer circuit outputs data which exceeds said range, according to said setting, only when said data is valid.

4. A data transfer control method for shifting and transferring data of a given length by a prescribed amount using a data transfer circuit for transferring data from a data source device to a data destination device, wherein a data train to be transferred is shifted over a range which is partitioned by units of said given length, a valid/invalid condition of data which, by said shifting, is within said range is determined by at least one of an external determination unit and the data transfer circuit in accordance with the amount of shift and set into said data transfer circuit, and wherein said data transfer circuit outputs data within said range, according to said setting, only when said data is valid.

5. A data transfer control method according to claim 4, wherein said range of data to be shifted is left end data of the train of said data, and wherein the valid/invalid condition of said left end data which, by shifting said data to the right, is within said range is set beforehand into said data transfer circuit, and further wherein said data transfer circuit outputs data within said range, according to said setting, only when said data is valid.

6. A data transfer control method according to claim 4, wherein said range of data to be shifted is right end data of the train of said data, and wherein the valid/invalid condition of said right end data which, by shifting of said data to the left, is within said range is set beforehand into said data transfer circuit, and further wherein said data transfer circuit outputs data within said range, according to said setting, only when said data is valid.

7. A data transfer control method for shifting and transferring data of a given length by a prescribed amount using a data transfer circuit for transferring data from a data source device to a data destination device, wherein information with regard to a boundary partition of source data and the amount of valid data from said boundary partition is set into said data transfer circuit, wherein, according to said setting, a judgment of the valid/invalid condition of data forced out of said boundary partition by the shifting is performed by said data transfer circuit, a valid/invalid condition of data being determined by at least one of an external determination unit and the data transfer circuit in accordance with the amount of shift, and wherein, in accordance with the results of said judgment, the forced out data after shifting is output only when valid.

8. A data transfer circuit for transferring data from a data source device to a data destination device, for the shifting and transferring of data of a given length by a prescribed amount, said data transfer circuit comprising:

data receiving means for receiving data read out of said data source device in prescribed units;

parameter holding means for holding parameters, which comprise settings of the amount of shift, the horizontal size of data to be transferred, and a valid/invalid condition of the data after shifting, as well as judgment information associated therewith;

shift processing means for shifting data received by said data receiving means by an amount set as one of said parameters to one direction of the left direction and the right direction;

valid/invalid indication means for performing a judgment with respect to one of the forced out data caused by said shift and data within said given length as to whether said data is valid or invalid, the valid/invalid condition of data being determined by an external determining means and/or the data transfer circuit in accordance with the amount of shift,; and transfer suspension control means for suspending transfer of said data when data after shifting is indicated by said valid/invalid indication means as being valid.

9. A data transfer circuit according to claim 8, wherein said judgment information is information regarding a boundary partition of transferred data and regarding an amount of valid data from said boundary partition.

10. A data transfer circuit, which is connected between a control unit and a data source device, for the shifting and transferring of data of a given length by a prescribed amount, said data transfer circuit comprising:

a data receiving unit receiving data read out of said data source device in prescribed units;

a parameter holding unit holding parameters, which comprise settings from the control unit of the amount of shift, a horizontal size of data to be transferred, and a valid/invalid condition of the data after shifting, as well as judgment information associated therewith;

a shift processing unit shifting data received by said data receiving unit by an amount set as one of said parameters to one of the left direction and right direction;

a valid/invalid indication unit performing a judgment with respect to one of forced out data caused by said shift and data within said given length as to whether said data is valid or invalid, the valid/invalid condition of data being determined by at least one of an external determination unit and the data transfer circuit in accordance with the amount of shift; and a transfer suspension control unit suspending transfer of said data when data after shifting is indicated as valid by said valid/invalid indication unit.

11. A data transfer circuit according to claim 10, wherein said judgment information is information regarding a boundary partition of transferred data and regarding an amount of valid data from said boundary partition.

12. A data transfer control method for shifting and transferring data of a given length by a prescribed amount using a data transfer circuit for transferring data from a data source device to a data destination device, comprising:

shifting a data train received from the data source over a range partitioned by units of the given length;

determining a valid/invalid condition by at least one of an external determination unit and the data transfer circuit in accordance with the amount of shift; and outputting from the data transfer circuit to the data destination device resultant data exceeding the range, only when the resultant data is valid.

13. A data transfer control method for shifting and transferring data of a given length by a prescribed amount using a data transfer circuit for transferring data from a data source device to a data destination device, comprising:

receiving data from the data source device read out in a fixed sequence;

shifting the data received from the data source device to the right or left in accordance with the amount of shift set in a parameter holding unit;

determining in accordance with information in the parameter holding unit the validity of data generated by shifting, to the right or to the left;

transferring the data to the data destination device, if the data is determined valid or suspending transfer of the data to the data destination device if the data is determined invalid.

* * * * *

UNITED STATES PATENT AND TRADEMARK OFFICE
CERTIFICATE OF CORRECTION

PATENT NO.: 5,887,197
DATED : March 23, 1999
INVENTOR(S): Hiroshi ISOMURA

It is certified that error appears in the above-identified patent and that said Letters Patent is hereby corrected as shown below:

On the title page, [73] Assignee, change "Kanagawa" to --Kawasaki--.

On the title page, [57] Abstract, line 5, delete ":".

Col. 9, line 1, change "6E" to --6G--.

Col. 13, line 7, change ",;" to --;--.

Signed and Sealed this

Twenty-fourth Day of August, 1999

Attest:

Q. TODD DICKINSON

*Attesting Officer*  *Acting Commissioner of Patents and Trademarks*